United States Patent
Meinzinger et al.

(10) Patent No.: US 8,491,293 B2
(45) Date of Patent: Jul. 23, 2013

(54) MAGAZINE APPARATUS FOR THE STORAGE OF BLOW MOULDS AND METHODS OF STORING BLOW MOULDS

(75) Inventors: Rupert Meinzinger, Kirchroth (DE);
Thomas Hoellriegl, Teublitz (DE);
Klaus Voth, Obertraubling (DE);
Thomas Albrecht, Beilngries (DE);
Erik Blochmann, Neutraubling (DE)

(73) Assignee: Krones AG, Neutraubling (DE)

( * ) Notice: Subject to any disclaimer, the term of this patent is extended or adjusted under 35 U.S.C. 154(b) by 308 days.

(21) Appl. No.: 12/871,270

(22) Filed: Aug. 30, 2010

(65) Prior Publication Data
US 2011/0052744 A1 Mar. 3, 2011

(30) Foreign Application Priority Data
Sep. 2, 2009 (DE) .......................... 10 2009 039 700

(51) Int. Cl.
*B29C 49/36* (2006.01)
*B29C 49/42* (2006.01)

(52) U.S. Cl.
CPC ............. *B29C 49/36* (2013.01); *B29C 49/4205* (2013.01)
USPC ......... 425/186; 29/401.1; 29/426.1; 414/278; 425/522; 425/540

(58) Field of Classification Search
USPC .. 425/182, 186, 195, 522, 540, 541; 414/278; 29/401.1, 426.1
See application file for complete search history.

(56) References Cited

U.S. PATENT DOCUMENTS

| | | | | |
|---|---|---|---|---|
| 4,737,095 A | * | 4/1988 | Hehl | 425/190 |
| 5,120,179 A | * | 6/1992 | Henderson et al. | 414/278 |
| 5,232,716 A | * | 8/1993 | Seto et al. | 425/185 |
| 5,339,597 A | | 8/1994 | Naka et al. | |
| 5,791,852 A | | 8/1998 | Bibby et al. | |
| 6,644,951 B2 | | 11/2003 | Lupke et al. | |
| 2002/0025355 A1 | | 2/2002 | Lupke et al. | |
| 2009/0061041 A1 | * | 3/2009 | Kiefl | 425/534 |
| 2009/0178264 A1 | * | 7/2009 | Stoiber | 29/401.1 |

FOREIGN PATENT DOCUMENTS

| | | |
|---|---|---|
| DE | 2158537 | 6/1972 |
| DE | 19906308 | 8/2000 |
| DE | 20007270 U1 | 10/2000 |
| EP | 0572107 | 12/1993 |
| FR | 2711629 | 5/1995 |
| FR | 2794729 | 12/2000 |
| JP | 2004018239 A * | 1/2004 |
| WO | 2009018952 | 2/2009 |

OTHER PUBLICATIONS

International Search Report in corresponding European Patent Application No. 10 17 4591.
International Search Report in corresponding German Patent Application No. 10 2009 039 700.0.

* cited by examiner

*Primary Examiner* — Robert B Davis
(74) *Attorney, Agent, or Firm* — Onell & Mello, LLP

(57) ABSTRACT

A magazine apparatus including a plurality of receiving elements that are constructed and arranged to separately receive individual blow molds each having a plurality of parts and each configured to shape plastic-material pre-forms into plastic-material containers. The magazine apparatus being constructed and arranged to store a plurality of blow molds outside the working operational area of a blow molding machine.

21 Claims, 9 Drawing Sheets

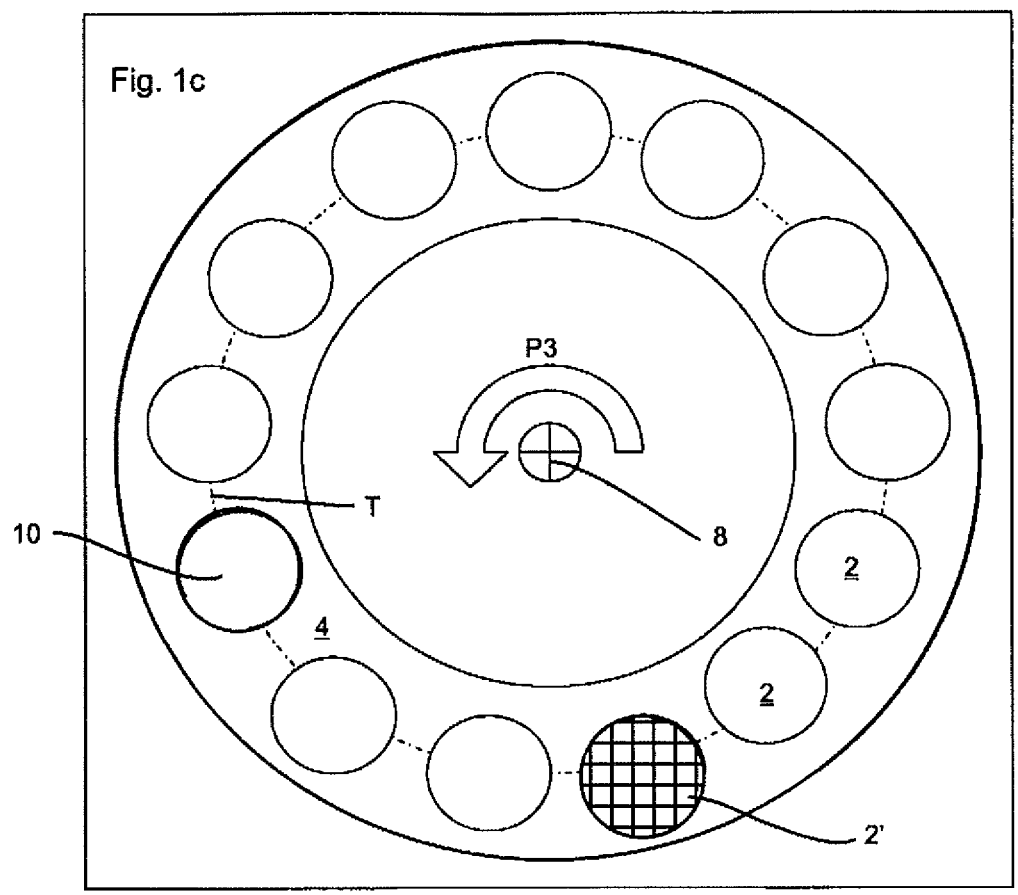
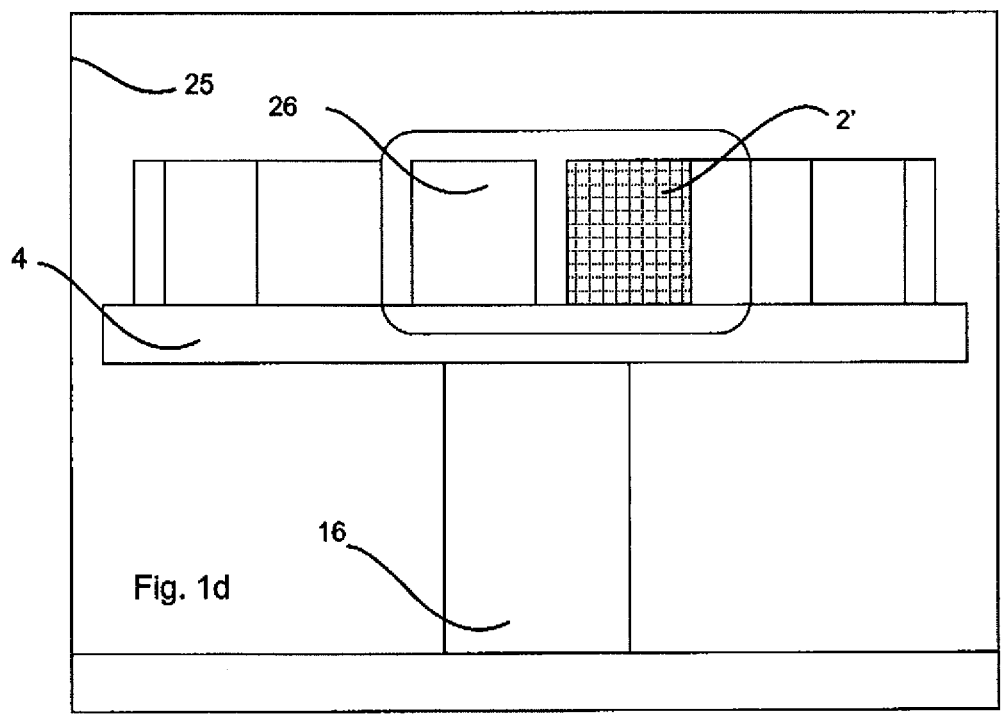

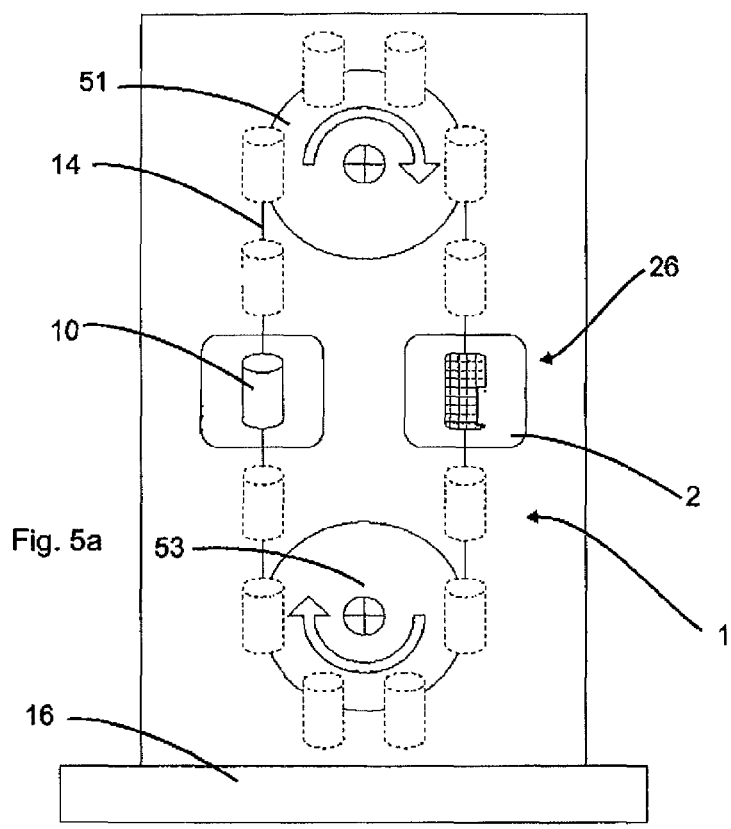
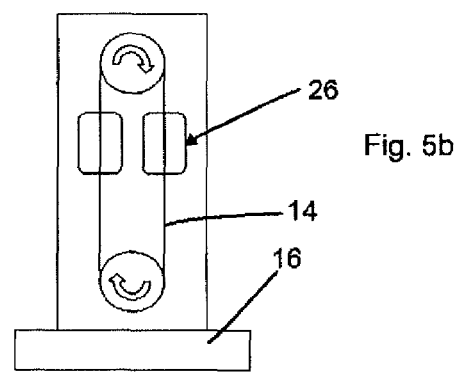
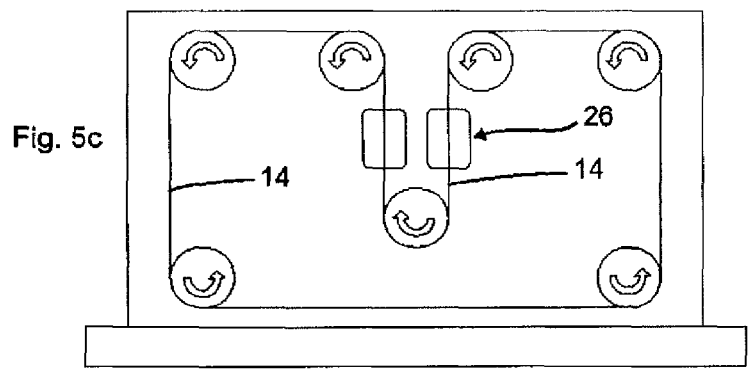

MAGAZINE APPARATUS FOR THE STORAGE OF BLOW MOULDS AND METHODS OF STORING BLOW MOULDS

RELATED APPLICATIONS

This application claims priority to German Patent Application No. 10 2009 039 700.0, filed on Sep. 2, 2009, in the German Patent and Trademark Office, the content of which is incorporated herein by reference in its entirety.

TECHNICAL FIELD

The present inventive concepts generally relate to magazine apparatus for the storage of blow moulds, systems for the storing blow moulds, and methods of storing blow moulds.

BACKGROUND

Conventional blow moulds are known from the prior art, and are used to shape plastic-material pre-forms into plastic-material containers, in particular PET bottles, usually in the context of a blow-moulding process. Accordingly, it is occasionally necessary for a particular set of blow moulds to be interchanged with another set of blow moulds, for example if other bottle formats are to be blow-moulded. The blow moulds that are not being used are usually stored in magazines, in which case the blow moulds are dismantled into their individual parts, such as for example two side parts and a base part, for this purpose and are housed in a corresponding receiving container.

A blow-moulding machine for producing containers is known from WO 2009/018952, published on Feb. 12, 2009, the content of which is incorporated herein by reference in its entirety. The blow-moulding machine has a conveying path carrying a mandrel holder and pre-form mandrels attached to the mandrel holder in an interchangeable manner by means of releasable couplings. Each coupling has a mandrel-clamping mechanism and a release element accessible from the outside and adjustable at least relative to the mandrel holder.

An operating-head changer for a rotation system for handling containers is known from EP 0 572 107, published on Dec. 1, 1993, and U.S. Pat. No. 5,339,597, issued on Aug. 23, 1994, the contents of which are each incorporated herein by reference in their entirety.

SUMMARY

An object of the present inventive concepts is to reduce the changing times for blow moulds of this type.

A magazine apparatus according to embodiments of the present inventive concepts, for the storage of a plurality of blow moulds outside the working operation of the blow moulds, these blow moulds being used for the shaping of plastic-material pre-forms to form plastic-material containers and being constructed in a plurality of parts in each case, can comprise a plurality of receiving means in order to receive the individual blow moulds separately from one another, the receiving means being designed in such a way that the blow moulds are capable of being received separately by them. In some embodiments, it is preferable for the receiving means to be holding means that engage with at least one region of the blow moulds so as thereby to permit a stable grip of the blow moulds.

In some embodiments, it is preferable for the blow moulds to be received in an at least a partially assembled state by the receiving means.

Whereas, as mentioned above, in the case of the prior art, the prior art blow moulds are deposited as individual parts in magazines. It is therefore proposed here that the blow moulds of the present inventive concepts should be arranged at least partially assembled on or in suitable receiving means in the magazine. In this case, these receiving means can be both receiving means—in the narrower sense—which grip the blow moulds, and for example storage spaces or receiving pockets which are suitable for receiving the blow moulds separately.

Throughout the description and the claims, the expression "partially assembled" is to be understood to mean that there is a pre-set geometrical relationship between the individual parts of the blow moulds. In this way, for example, the lateral parts of the blow mould can be set against each other, and in some embodiments a base part can be mounted in this blow mould. According to magazine embodiments disclosed herein, it becomes possible for it to be unnecessary first of all to search for the individual parts of blow moulds when re-installing the blow moulds, but rather the blow mould is already present in a state ready for assembly and can if necessary also be inserted into the machines automatically.

In particular, the blow moulds can be isolated in this case, e.g., are stored in a state not suitable for operation and, in some instances, without mould carriers.

It is advantageous for the magazine apparatus to be designed in such a way that the blow moulds are spaced more closely than in the case of a blow-moulding machine on which they are arranged in normal working operation.

The blow moulds are usually arranged completely assembled, e.g., with the lateral parts and the base parts, in the receiving means or on the holding means.

It is advantageous for the receiving means to be adapted to receiving means of an apparatus for shaping plastic-material pre-forms to form plastic-material containers, in which apparatus the blow moulds are present in working operation of this apparatus. In this case it is possible for the blow moulds to be removed in a still-assembled state from the apparatus for shaping plastic-material pre-forms to form plastic-material containers, which has likewise not been known in the prior art until now. In this way, the receiving means of the magazine apparatus and the blow-moulding machine could be made similar and could thus for example be connected in the same way to the blow moulds. It would also be possible, however, for the receiving means of the magazine apparatus only to be adapted to the receiving means of the blow-moulding machine in such a way that the same blow moulds can be held or received both by the receiving means or holding means of the blow-moulding machine and by the receiving means or holding means of the magazine apparatus.

In this way, for example, the receiving means can be designed in the same way as similar holding means on which the blow moulds are arranged in working operation. It would also be possible, however, for the adaptation to be arranged in such a way that it merely ensures that the blow moulds can be accommodated in the magazine apparatus without additional adapter elements, e.g., for example gripping elements or the like are provided.

It would also be possible, however, for an adapter member to be deliberately provided which during the dismantling of the blow moulds is deployed on or in the latter and on which the blow moulds are arranged on the receiving means.

In a further advantageous embodiment, a plurality of receiving means are arranged or are capable of being arranged on a common carrier device. In this way it is possible for a plurality of receiving means to be moved as desired and preferably at the same time in order to carry out an exchange of the blow moulds in an automatic manner. It is preferable for the magazine apparatus therefore to have a conveying device for conveying or moving the blow moulds or receiving means. This conveying device preferably has a driving device, but it would also be possible for the blow moulds to be moved manually with respect to the magazine apparatus.

In a further advantageous embodiment the magazine apparatus has a stand and the carrier device is designed so as to be movable with respect to this stand. A stand is to be understood as being any basic structure of the magazine, so that the stand can also for example be a base part arranged so as to be stationary. It is advantageous for the carrier device to be arranged in a rotatable manner with respect to this stand or—if the carrier device is a circulating chain—in such a way that the blow moulds are preferably capable of being conveyed in a pre-set plane. The plane in which the blow moulds are movable in the magazine apparatus preferably corresponds to that plane in which the blow moulds are also movable in working operation. It is advantageous for the receiving means to be movable with the conveying device along a closed path, for example a circular or oval path.

In a further advantageous embodiment the carrier device is also vertically adjustable, e.g., it is movable in particular in a direction which is at a right angle to the direction of movement of the receiving means.

In a further advantageous embodiment the magazine apparatus are made movable in their entirety. In this way, for example, rolls can be provided in order to displace the magazine apparatus with respect to the floor.

In a further advantageous embodiment the apparatus has a driving device for moving the carrier device. This can be for example a motor or a servo-motor which drives, and for example turns, the carrier device in a pre-set manner. It is advantageous for this driving device to be capable of being synchronized with a driving device of the apparatus for shaping plastic-material pre-forms into plastic-material containers. In this way, it is possible, for example, for the driving device to be jointly clock-timed with the apparatus for the shaping, so that an automated removal or supply of the blow moulds from and to the apparatus for the shaping is possible.

In a further advantageous embodiment the number of the receiving means is larger than the number of the receiving means of the apparatus for shaping plastic-material pre-forms to form plastic-material containers. In this way a direct exchange is possible. Thus for example at the beginning of an exchange a first blow mould can be removed from the apparatus for the shaping and can be deposited in a free space of the magazine apparatus. After that, a new blow mould can be transferred to the apparatus in an alternate manner in each case and the apparatus can conversely release the old blow moulds to the magazine apparatus. In this way it is possible for example for the magazine apparatus to have one more receiving means than the associated apparatus for shaping plastic-material pre-forms.

It is advantageous for the apparatus to have a receiving area for receiving further elements which co-operate with the blow moulds in the shaping of plastic-material pre-forms to form plastic-material containers. In the shaping of plastic-material pre-forms to form plastic-material containers, in addition to the blow moulds a plurality of further elements are used which occasionally have to be interchanged together with the blow mould. The magazine apparatus in this embodiment allows a more or less complete set of moulds to be received as required for shaping plastic-material pre-forms. In this way, the user can find the components correct in each case for a specific blow-moulding station in a comparatively short time.

It is advantageous for the further elements to be selected from a group of elements which includes holding mandrels, holding clamps, holding members for conveying the blow mould, stretching rods, stretching stops, blow nozzles and the like. In particular, it is possible for individual elements or all the elements of this group to be arranged in an assembled state with the individual blow mould or in a pre-set geometrical relationship with the blow mould.

In a further advantageous embodiment the carrier device is designed in the form of a disc-like body, a circulating chain, a rail or a movable, and in particular a rotatable, housing. It is preferable for this carrier device to permit, as mentioned above, a conveying of the blow moulds so that the carrier device is used at the same time as a conveying device for the blow moulds. It is advantageous in this case for the blow moulds to be conveyed at least for a time in a pre-set plane and, in a particularly preferred manner, in the same plane in which they are also conveyed in working operation. It would also be possible, however, for the blow moulds to be conveyed with the magazine apparatus in a direction deviating from this, for example to be conveyed at a right angle to the plane.

In a further advantageous embodiment the apparatus has a transfer area which is used both for the take-over of a first blast-pipe mould from the apparatus for shaping plastic-material pre-forms to form plastic-material containers and for the transfer of a second mould to the apparatus for shaping plastic-material pre-forms to form plastic-material containers.

By way of this transfer area it is possible both for old moulds for exchanging to be removed from the apparatus for the shaping and for new blow moulds to be transferred to the apparatus for the shaping. In this case the transfer area is advantageously the only area by way of which the blow moulds can be removed.

In this case this transfer area can be formed by an opening in the magazine apparatus into which for example a further conveying device, and in particular but not exclusively an inlet or outlet star of a plant, can engage. In this way it is possible for the magazine apparatus to be linked to a blow-moulding machine in order to exchange the blow moulds. It is thus preferable for only specific blow moulds or receiving means for the take-over or the transfer to be accessible through the transfer area. In this case this transfer area can be designed in the form of an opening in a housing wall of the magazine apparatus.

In this case it would also be possible for this transfer area to permit simultaneous removal of an old blow mould and the supply of a new blow mould to the blow-moulding machine. In this way it would be possible for example for the magazine apparatus to be designed in the manner of a so-called paternoster lift, in which the blow moulds are conveyed for example in the vertical direction and are transferred to the blow-moulding machine and/or are removed therefrom at specified locations in each case. In addition, two discs arranged one upon the other could be provided for example, in which case one disc acts as a receiving device for the old blow moulds and a further disc acts as a receiving device for the new blow moulds.

In a further advantageous embodiment the apparatus has a plurality of holding devices arranged on a carrier device, each holding device having provided thereon at least two receiving means for receiving the blow moulds in each case. It is thus possible for example for one of these holding devices to have a receiving means occupied with a new blow mould as well as an empty receiving means in each case, this empty receiving means being used for receiving an old blow mould. In this way, the apparatus can be used for retrofitting a blow-moulding machine for two different types of blow mould.

In the context of the present application the expression "old blow moulds" relates to those blow moulds which are to be dismantled from the blow-moulding machine and the expression "new blow moulds" relates to those blow moulds with which the blow-moulding machine is to be re-equipped and which are thus first arranged in the magazine apparatus.

The present inventive concepts further relate to a method of storing blow moulds, in which these blow moulds are used for shaping plastic-material pre-forms to form plastic-material containers. According to the present inventive concepts the blow moulds of an apparatus for shaping plastic-material pre-forms to form plastic-material containers are removed and are arranged in an at least partially assembled state but separately on or in a plurality of receiving means of a magazine apparatus. It is thus also proposed with respect to the method that the blow moulds should be arranged in an at least partially assembled state in the magazine apparatus. It is advantageous for the blow moulds to be stored in a state in which at least parts of the blow moulds are fastened on one another or to one another.

In one aspect, a magazine apparatus comprises a plurality of receiving elements that are constructed and arranged to separately receive individual blow moulds each having a plurality of parts and each configured to shape plastic-material pre-forms into plastic-material containers, wherein the magazine apparatus is constructed and arranged to store a plurality of blow moulds outside the working operational area of a blow moulding machine.

In one embodiment, the plurality of receiving elements are further configured to receive and store blow moulds in at least a partially assembled state.

In another embodiment, the working operational area of a blow moulding machine comprises a blow moulding wheel having a plurality of blow moulding carriers.

In another embodiment, the receiving elements of the magazine apparatus are constructed and arranged to receive blow moulds configured to shape plastic-material pre-forms into plastic-material containers from one or more of the plurality of blow moulding carriers.

In another embodiment, a number of the receiving elements of the magazine apparatus is greater than a number of blow moulding carriers.

In another embodiment, the magazine apparatus further comprises a conveying device for conveying blow moulds received from a blow moulding machine.

In another embodiment, the plurality of receiving elements are arranged on a common carrier device.

In another embodiment, the magazine apparatus further comprises a stand to which the common carrier device is attached, the common carrier device being constructed and arranged so as to be rotatably movable with respect to the stand.

In another embodiment, the magazine apparatus further comprises a driving device for rotatably moving the common carrier device.

In another embodiment, the driving device is constructed and arranged to be synchronized with a driving device of an apparatus configured to shape plastic-material pre-forms into plastic-material containers.

In another embodiment, the magazine apparatus is movable.

In another embodiment, a number of the receiving elements is larger than a number of receiving elements of the apparatus configured to shape plastic-material pre-forms into plastic-material containers.

In another embodiment, the magazine apparatus further comprises a receiving area for receiving further elements co-operating with blow moulds in the shaping of plastic-material pre-forms into plastic-material containers.

In another embodiment, the further elements are selected from the group consisting of: holding mandrels, holding clamps, holding members for conveying blow moulds, stretching rods, stretching stops and blow nozzles.

In another embodiment, the common carrier device comprises a disc-like body, a circulating chain, and a rail or a movable housing.

In another embodiment, the magazine apparatus further comprises a transfer area that permits both the take-over of a first blow mould from an apparatus configured to shape plastic-material pre-forms into plastic-material containers and the transfer of a second blow mould to the apparatus configured to shape plastic-material pre-forms into form plastic-material containers.

In another embodiment, the magazine apparatus further comprises a plurality of holding devices arranged on a carrier device, wherein at least two receiving elements are provided on each holding device.

In another aspect, a method of storing blow moulds which are used for the shaping of plastic-material pre-forms into plastic-material containers, comprises: removing blow moulds from an apparatus configured to shape plastic-material pre-forms into plastic-material containers; and separately receiving and storing one or more blow moulds in an at least partially assembled state at one or more of a plurality of receiving elements of a magazine apparatus.

In one embodiment, the plurality of receiving elements of the magazine apparatus are constructed and arranged to separately receive individual blow moulds each having a plurality of parts and that are configured to shape plastic-material pre-forms into plastic-material containers.

In another aspect, a magazine apparatus (1) for the storage of a plurality of blow moulds (10) outside the working operation of the blow moulds (10), which blow moulds (10) are used for the shaping of plastics-material pre-forms to form plastics-material containers and which are constructed in a plurality of parts in each case, wherein the magazine apparatus (1) has a plurality of receiving means (2, 12) in order to receive the individual blow moulds separately from one another, wherein the receiving means (2, 12) are designed in such a way that the blow moulds (10) are capable of being received separately by them.

In one embodiment, the blow moulds are capable of being received in an at least partially assembled state by the receiving means (2, 12).

In another embodiment, the receiving means (2, 12) are adapted to receiving means of an apparatus (50) for the shaping of plastics-material pre-forms to form plastics-material containers, in which the blow moulds (10) are present in the working operation of this apparatus (50).

In another embodiment, the magazine apparatus (1) has a conveying device for conveying the blow moulds (10).

In another embodiment, a plurality of receiving means (2, 12) are arranged on a common carrier device (4, 14, 24).

In another embodiment, the magazine apparatus has a stand (16) and the carrier device (4, 14, 24) is designed so as to be movable with respect to this stand (16).

In another embodiment, the magazine apparatus (1) is made movable in its entirety.

In another embodiment, the magazine apparatus (1) has a driving device (8) for moving the carrier device (4, 14, 24).

In another embodiment, the driving device (8) is capable of being synchronized with a driving device of the apparatus (50) for the shaping of plastics-material pre-forms into plastics-material containers.

In another embodiment, the number of the receiving means (2, 12) is larger than the number of the receiving means (52) of the apparatus (50) for the shaping of plastics-material pre-forms to form plastics-material containers.

In another embodiment, the magazine apparatus (1) has a receiving area for receiving further elements co-operating with the blow moulds in the shaping of plastics-material pre-forms to form plastics-material containers.

In another embodiment, the further elements are selected from a group of elements which includes holding mandrels, holding clamps, holding members for conveying the blow mould, stretching rods, stretching stops, blow nozzles and the like.

In another embodiment, the carrier device is designed in the form of a disc-like body (4), a circulating chain (14), a rail (24) or a movable housing.

In another embodiment, the magazine apparatus has a transfer area (26) which permits both the take-over of a first blow mould from the apparatus for the shaping of plastics-material pre-forms to form plastics-material containers and the transfer of a second blow mould to the apparatus for the shaping of plastics-material pre-forms to form plastics-material containers.

In another embodiment, the magazine apparatus (1) has a plurality of holding devices (6) arranged on a carrier device, wherein at least two receiving means (2, 12) are provided on each holding device in each case.

In another aspect, a method of storing blow moulds which are used for the shaping of plastics-material pre-forms to form plastics-material containers, wherein the blow moulds of an apparatus for the shaping of plastics-material pre-forms to form plastics-material containers are removed and are preferably arranged in an at least partially assembled state and separately on a plurality of receiving means of a magazine apparatus (1).

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

FIGS. 1a to 1h show a magazine apparatus according to a first embodiment of the present inventive concepts;

FIGS. 5a to 5g show a further embodiment of a magazine apparatus according the present inventive concepts.

DETAILED DESCRIPTION OF EMBODIMENTS

Figure 1A:
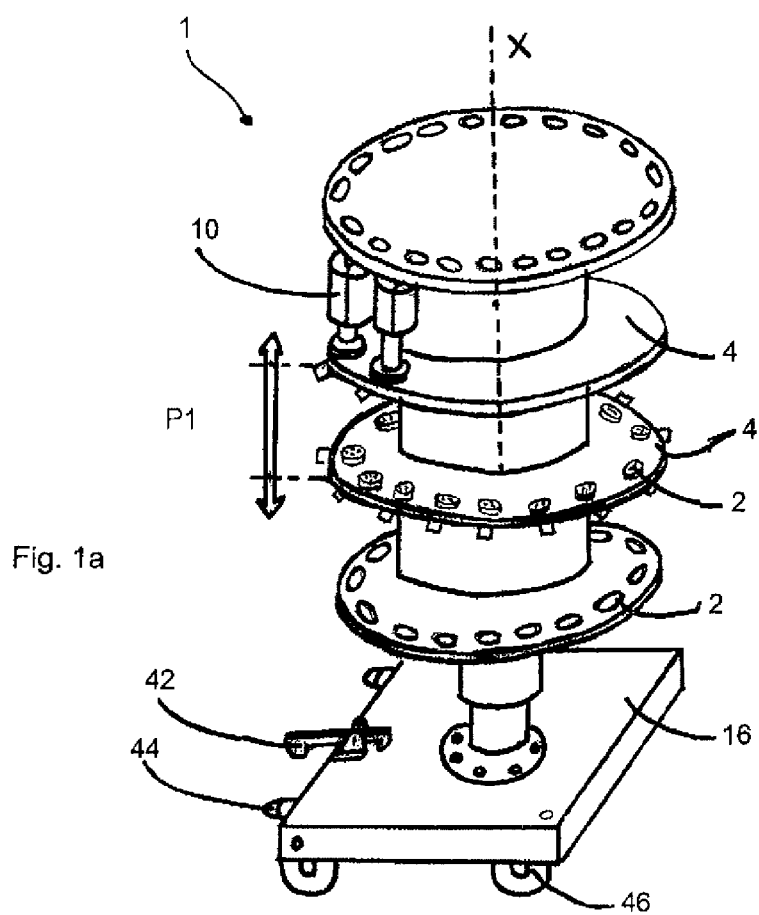

FIG. 1a is a simplified illustration of a magazine apparatus 1. A plurality of receiving elements 2, which are arranged here on a carrier device 4 in the form of a disc or plate, are provided in this embodiment of a magazine apparatus. The blow moulds 10 are shown received in an assembled state in the magazine apparatus 1.

In this embodiment, the individual receiving elements 2 are arranged uniformly on the carrier device 4 in the peripheral direction. In some embodiments, the individual receiving elements 2 are equally spaced apart from each other on the carrier device 4 by a predetermined distance. In addition, it is possible for a plurality of carrier devices 4 to be provided, which for example are also displaceable in the direction of the arrow P1 jointly or independently of one another, but more particularly jointly. In this way the magazine apparatus 1 can be used for receiving a plurality of sets of blow moulds 10 or even larger numbers of blow moulds.

In addition, the individual carrier devices 4 are rotatable about a common axis of rotation X. The carrier devices 4 and also the individual receiving elements 2 are therefore arranged in a movable manner with respect to a stand 16. The reference number 42 designates a connecting device, such as a hook, by which the magazine apparatus 1 can be connected mechanically, for example, to a blow-moulding machine.

The reference numbers 44 designate connections, in particular electrical connections, by which the magazine apparatus 1 can be connected to a blow-moulding machine. In more detail, the apparatus illustrated in FIG. 1a is a circular magazine, which in this case has a plurality of receiving elements 2 that are designed in the same way as corresponding receiving means of an apparatus for shaping plastic-material pre-forms to form plastic-material containers.

In this case, the spacing of the individual receiving elements 2 or even the blow moulds are smaller than in the case of the blow-moulding machine, so that the magazine apparatus advantageously has a diameter which is between 1 meter and 3 meters, preferably between 1 meter and 2 meters. During operation, the magazine apparatus 1 preferably has one more receiving element 2 or set of receiving elements 2 than the blow-moulding machine associated therewith, so that even the first mould removed from the blow-moulding machine can be accommodated. As mentioned, the magazine apparatus 1 can be further clock-timed with respect to spacing with a rotating table of the blow-moulding machine. In some embodiments, the magazine apparatus 1 is made movable by rolling devices 46, and can be docked on a blow-moulding machine for the automatic removal of the blow moulds housed therein.

Figure 1B:
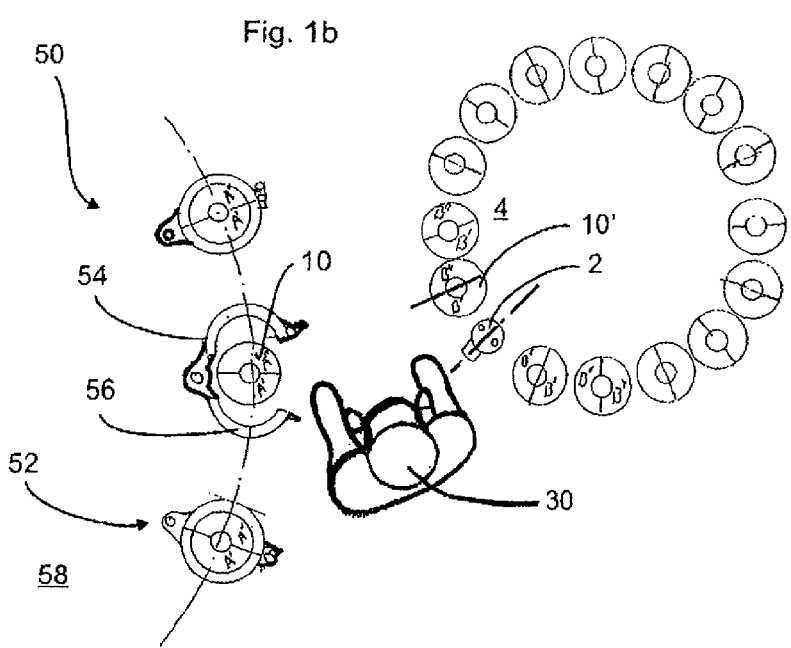

FIG. 1b is a diagrammatic illustration to explain the manner of operation of the magazine apparatus 1. In this case an apparatus for shaping plastic-material pre-forms for forming plastic-material containers or a blow-moulding machine 50 is also provided. The blow-moulding machine 50 can comprise a plurality of blow-mould carriers 52, which can be assembled from two lateral parts 54 and 56. In this case, the two lateral parts 54, 56 receive the blow mould 10 between themselves. When the blow mould 10 is changed, the two lateral parts 54 and 56 are first separated from the blow mould 10, and then the blow mould 10 is removed in an assembled state as shown in FIG. 1b. This can also be carried out manually by a user 30, as shown in FIG. 1b. The blow mould 10 can then be set on the receiving elements 2 or the magazine apparatus 1, which are still free in this case. A new blow mould 10' can be removed in a corresponding manner from the magazine apparatus 1, and can be inserted in the blow moulding carrier 52 of the blow-moulding machine 50 that is now free. The reference number 58 designates a blow wheel on which a plurality of blow-moulding stations or blow-mould carriers 52 are arranged.

FIG. 1c illustrates a procedure during the change of the blow moulds. In this case the carrier device 4 is again illustrated, which is designed in the form of a disc that is rotatable along the arrow P3. The reference numeral 8 designates a driving device, such as a servo-motor, that drives the carrier device 4. In this way, the individual blow moulds 10 are conveyed along a pre-set circular conveying path T in the magazine apparatus 1. The magazine apparatus 1 in the form of the rotatable carrier device 4 thus has a conveying device for conveying the blow moulds 10 along a pre-set path. In this case the reference number 2' designates a receiving element that is still free to receive a blow mould 10.

FIG. 1d is a side view of the apparatus as shown in FIG. 1c. It is evident in this case that an opening 26 or transfer area, through which for example new blow moulds can be removed from the magazine apparatus 1 and old blow moulds can be conveyed to the magazine apparatus 1, is provided on an external periphery of the apparatus. In this case this opening 26 represents the afore-mentioned transfer area. As stated, the carrier device 4 is rotatable, in particular also with respect to the opening 26. The reference number 25 designates a housing which surrounds the magazine apparatus 1.

In this case too the reference number 16 again designates the stand of the apparatus which in this case is arranged so as to be stationary.

Figure 1E:
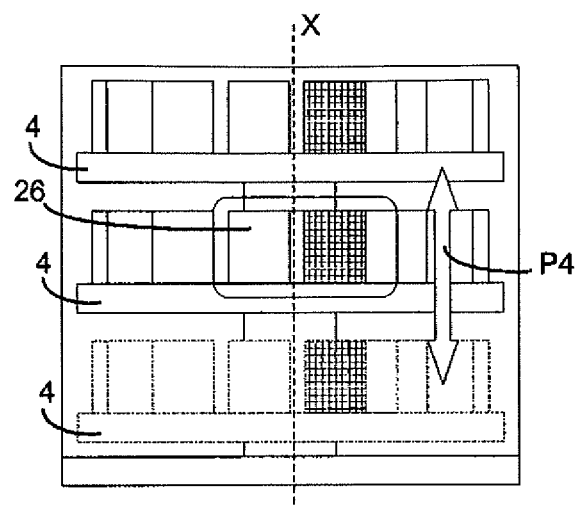

FIG. 1e shows a further advantageous detail of a magazine apparatus 1 according to the present inventive concepts. In this case a plurality of carrier devices 4, for example, three carrier devices 4, are provided and are arranged so as to be rotatable with respect to the axis X. Further, the carrier devices 4 can be vertically displaceable along the arrow P4. In addition, only one opening 26 of the height of the middle carrier device 4 is provided. This opening too is arranged so as to be stationary. The capacity of the magazine apparatus 1 can be increased by this procedure.

Figure 1F:
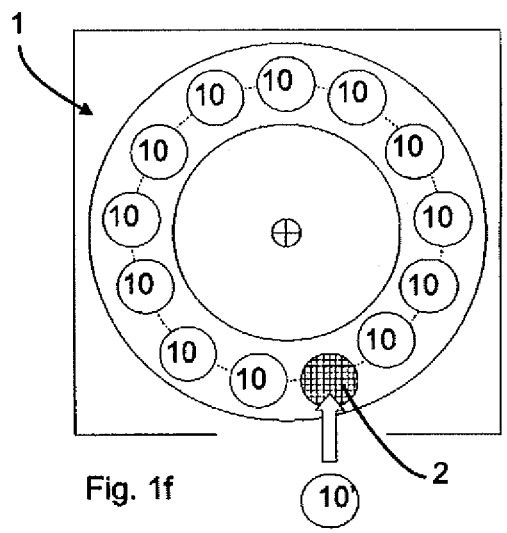
Figure 1G:
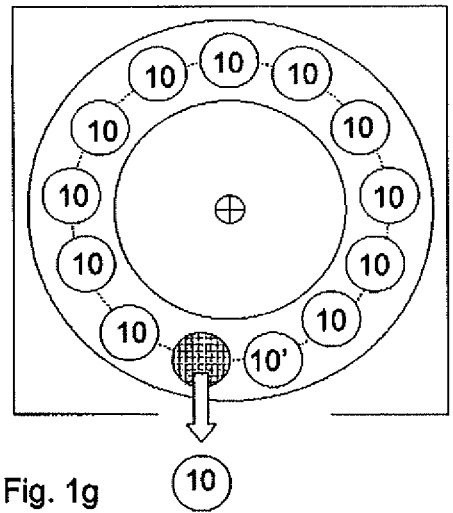
Figure 1H:
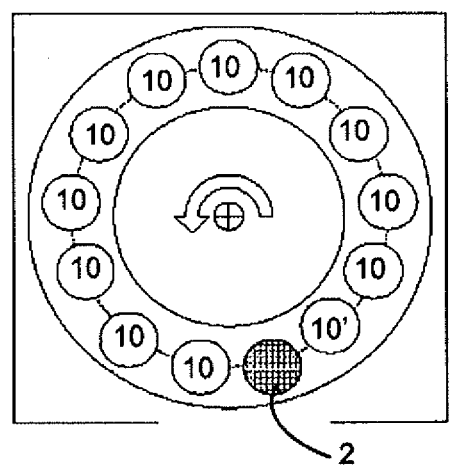

FIGS. 1f to 1h show different situations for explaining a change of the blow moulds. In the situation shown in FIG. 1f an old blow mould 10' is arranged on or in the free receiving elements 2 of the magazine apparatus 1. The other receiving elements 2 are still provided in each case with new blow moulds 10, i.e., blow moulds 10 which are to be interchanged with existing blow moulds installed in a blow moulding machine.

In the situation shown in FIG. 1g, a new blow mould 10 is likewise removed by way of the opening 26, and it can now be supplied to the blow-moulding machine. In the situation shown in FIG. 1h the support device has been turned further by one position or one spacing with respect to the blow moulds 10, so that a free receiving element 2 is now available again for receiving an old blow mould 10'. In this way, the procedure can be repeated starting from the situation shown in FIG. 1f.

Figure 2A:
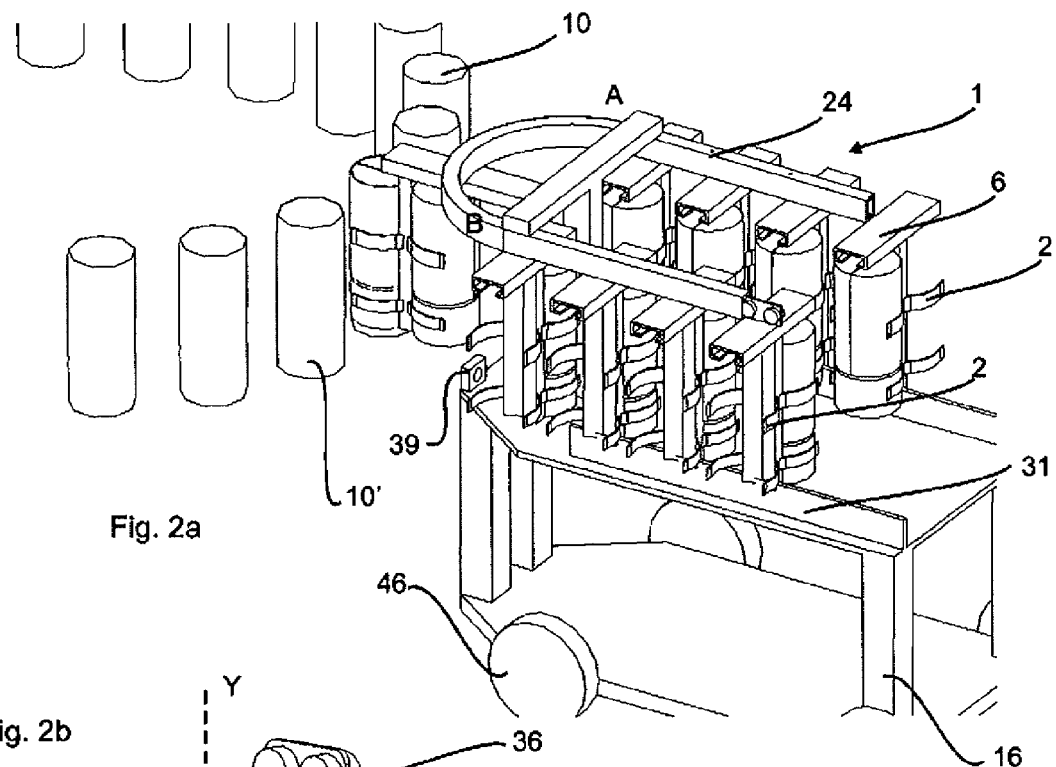
FIGS. 2a to 2c show a magazine apparatus according to a second embodiment of the present inventive concepts.
Figure 2B:
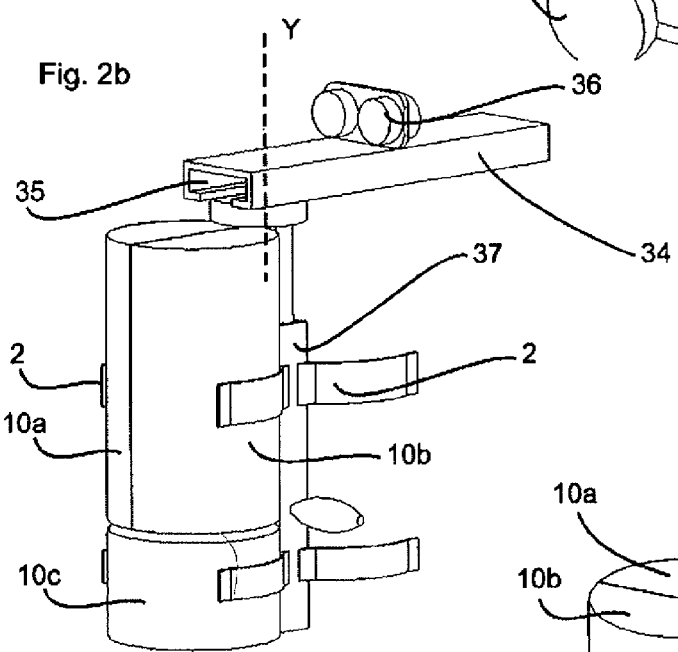
Figure 2C:
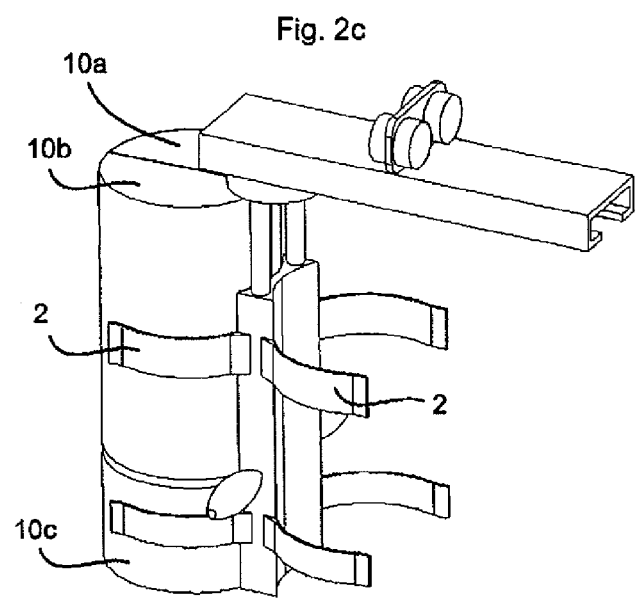

FIGS. 2a to 2c show a further embodiment of a magazine apparatus 1 according to the present inventive concepts. In this apparatus 1a conveying device 24 in the form of a continuous rail is provided. A plurality of holding devices 6 are provided on this conveying device 24. In this case, a holding device 6 has two receiving elements 2 for receiving blow moulds 10. These receiving elements 2 are also rotatable about the axes of rotation Y with respect to the holding device 6. A corresponding axis of rotation is shown in FIG. 2b. The holding devices 6 or mould slides are suspended individually by the aforesaid guiding rail or conveying device 24. It is advantageous for there to be no connection between the individual holding devices 6.

Furthermore, a linear displacement unit 34 is provided, which allows the blow mould 10 to be pushed into the receiving elements 2 or pulled out of the receiving elements 2. In addition, a lifting device 37 shown in FIG. 2b can also be provided, which can raise or lower the individual blow moulds 10 in the direction of the axis of rotation Y in order to raise them for example on a centring. The reference number 35 designates the rail guide or linear unit which permits movement of the two receiving elements 2 in the linear direction. The reference number 36 designates a roll device, which the holding device 6 is movable as a whole with respect to the rail 24.

It is also evident in this case that the blow mould 10 is formed from two lateral parts 10a and 10b and a base part 10c. In some embodiments, the receiving elements 2 grip both the two lateral parts 10a and 10b and the base part 10c of the blow mould 10, however, in alternate embodiments, the receiving elements can be configured to grip the two lateral parts 10a and 10b of the blow mould 10 or the base part 10c of the blow mould 10.

Furthermore, a gradient can be provided between the areas A and B of the magazine apparatus 1, so that the holding devices 6 move automatically towards an operator under the action of gravity. The reference number 31 designates a securing element which prevents a movement of the holding device 6 in areas other than the assembly area between A and B. It would also be possible, however, for the blow moulds 10 to be removed as individual parts in individual receiving elements if desired. In this case too it is advantageous for a docking device 39 to be provided in order to dock the magazine apparatus 1 on the blow-moulding machine.

FIGS. 3a to 3i show a further arrangement of a magazine apparatus 1 according to the present inventive concepts. In this case the receiving elements 12 are designed in each case in the form of cavities or receiving spaces, such as pockets, into which the individual blow moulds 10 can be inserted in. In some embodiments, the individual blow moulds can be inserted into the receiving elements 12 in at least a partially assembled state. Here too the entire stand is preferably movable and, in a particularly preferred manner, is rotatable about a pre-set axis of rotation X.

Figure 3A:
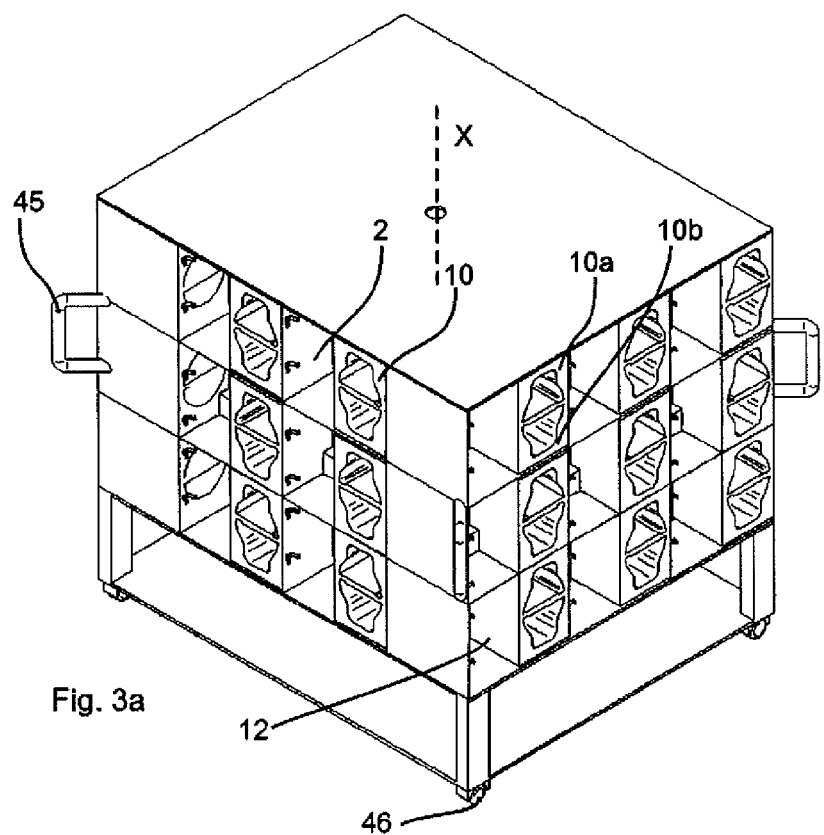
FIGS. 3a to 3i show a magazine apparatus according to a third embodiment of the present inventive concepts.

In the embodiment shown in FIG. 3a, rows of receiving elements 12 are provided in each case, every second row being occupied by (for example blow moulds to be changed) and every other second row being empty in each case in order to take over blow moulds from a blow-moulding machine. The reference number 45 designates a grip, such as a hand grip, which can be used by a user to pull the entire apparatus.

Figure 3B:
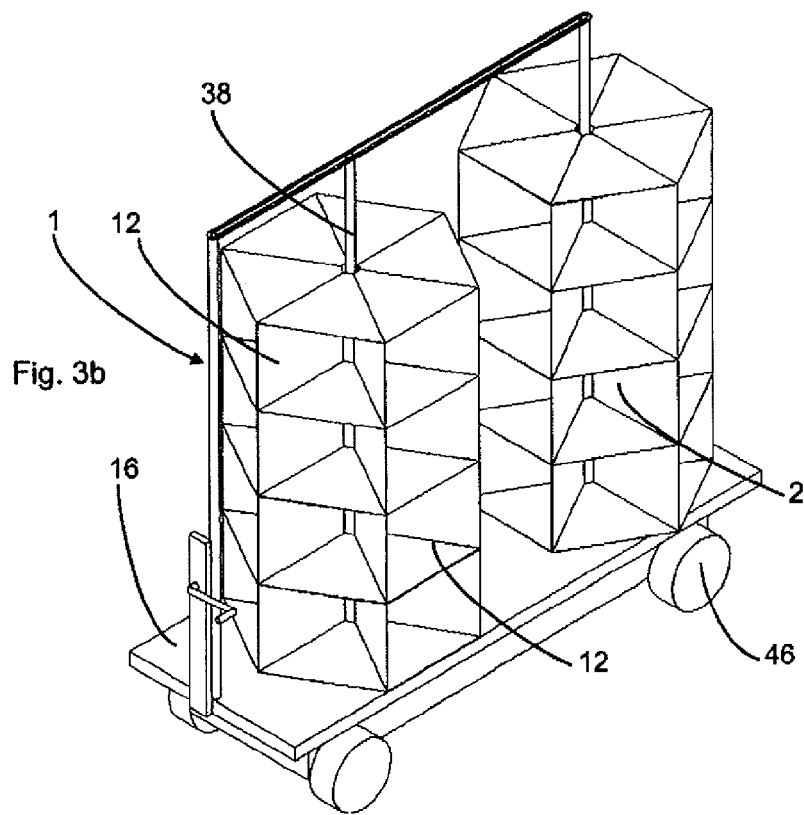

FIG. 3b shows a further embodiment of a magazine apparatus according to the present inventive concepts. In this case a shaft 38 is provided, about which a plurality of receiving elements 2 are arranged so as to be rotatable. In this way a carrier device, which is used to convey the individual blow moulds (not shown), is provided in this case too.

Figure 3C:
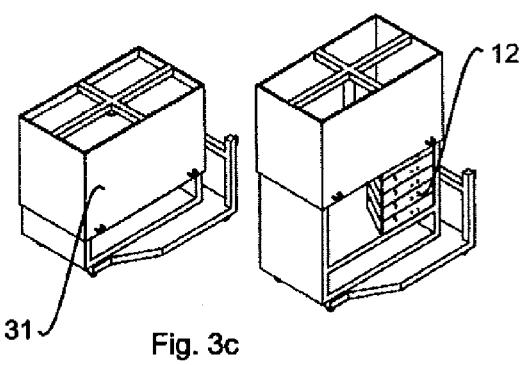
Figure 3D:
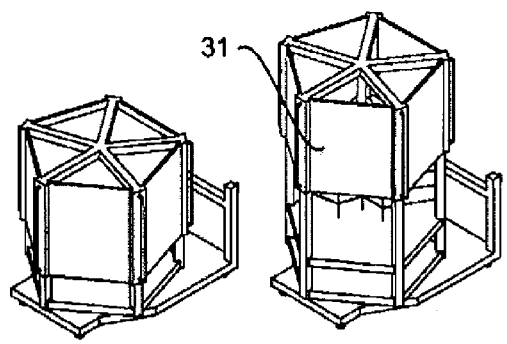
Figure 3E:
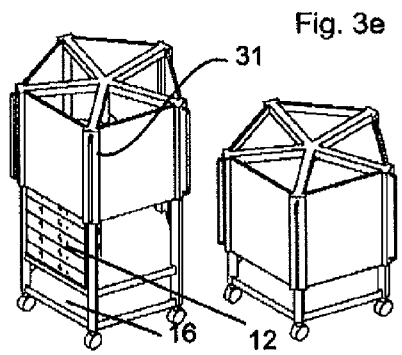
Figure 3F:
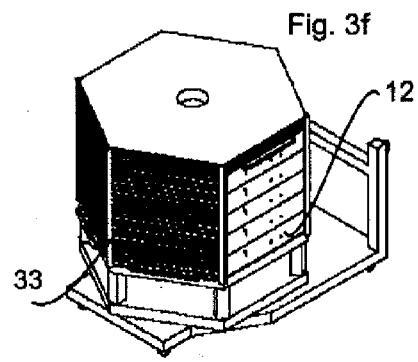
Figure 3G:
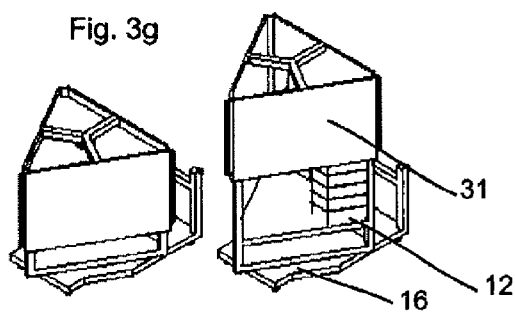
Figure 3H:
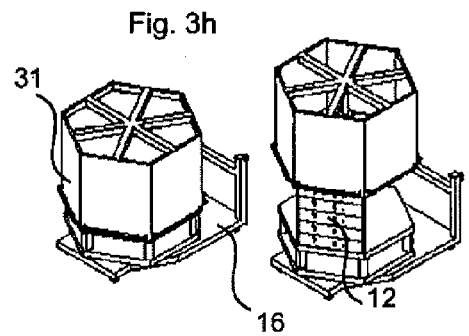
Figure 3I:
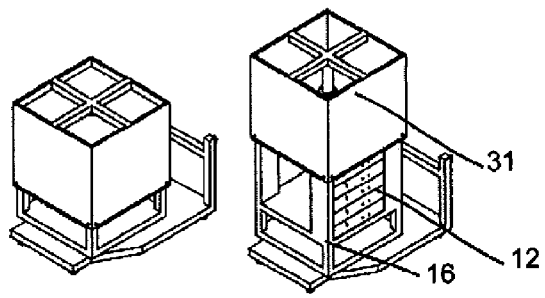

FIGS. 3c to 3d show other arrangements of magazine apparatuses according to the present inventive concepts, which differ in particular in their geometrical layout. In this case the individual magazine apparatus also have in each case covering elements which are displaceable in the direction of the axis of rotation in order to cover the receiving elements and possibly the blow moulds arranged therein. In the embodiment shown in FIG. 3f, a folding-bellows lock 33, which is used for covering the individual blow moulds and/or the receiving elements, is additionally provided.

Figure 4A:
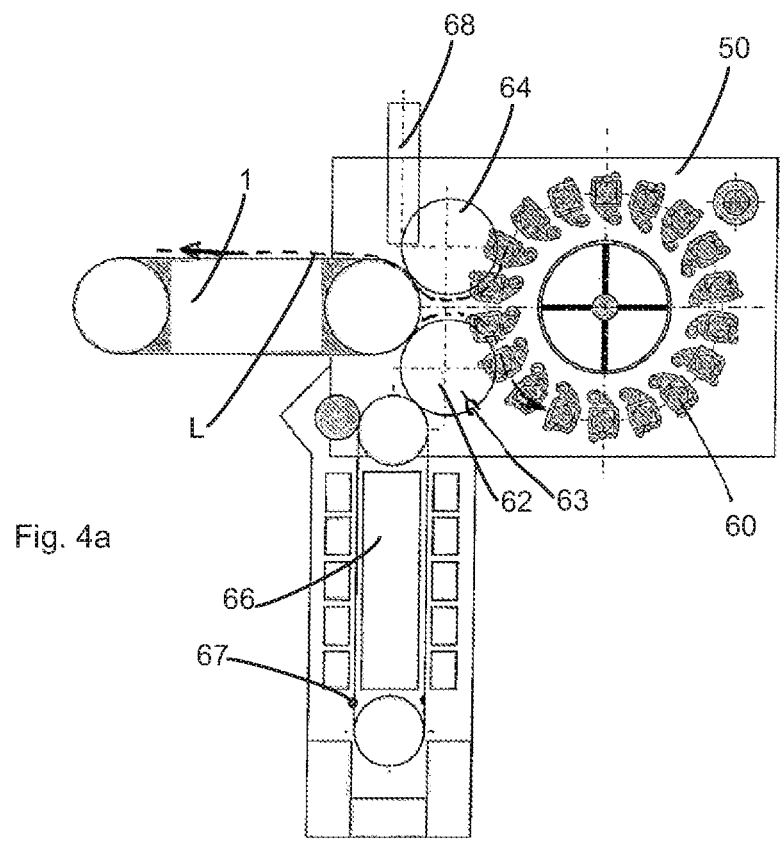
FIGS. 4a to 4b are two illustrations to explain the changing of a blow mould, in accordance with the present inventive concepts.

FIG. 4a shows illustrations to explain the plant according to the present inventive concepts. More precisely, a heating device 66 is shown here, which has a plurality of receiving mandrels or holding mandrels that guide the individual containers or pre-forms. The reference number 62 designates an inlet wheel from which the pre-forms are taken over by means of gripping devices 63 and are thus transferred to a blow-moulding machine 50 with a plurality of blow-moulding stations 60. After the plastics-material pre-forms have been expanded inside the individual blow-moulding stations 60 to form containers, the containers are removed by way of an outlet star 64 and a further conveying device 68.

In this case a magazine apparatus 1 according to the various embodiments disclosed herein can be arranged between the inlet star 62 and the outlet star 64 in order, in particular, to exchange the blow moulds 10, and in this case also other components of the apparatus. More precisely, the inlet 62 and outlet 64 stars that are present in any case can be used in order to simplify the changing procedure of the blow moulds. In addition, the afore-mentioned holding devices 63, such as for example gripping clamps and also the holding mandrels 67, can be interchanged. In this way it is possible for the holding mandrels 67 to be conveyed to the magazine apparatus by way of the inlet star 62 and also for example for the gripping elements 63 to be transferred to the magazine apparatus 1 by way of the inlet star 62.

In this case the magazine apparatus is thus used both to receive the blow moulds 10 and if necessary the gripping devices 63 as well as the holding mandrels 67. As made clear by the lines L indicated, the blow moulds are conveyed to the magazine apparatus by way of the outlet star and are guided from the magazine apparatus 1 to the blow-moulding machine 50 by way of the inlet star.

Figure 4B:
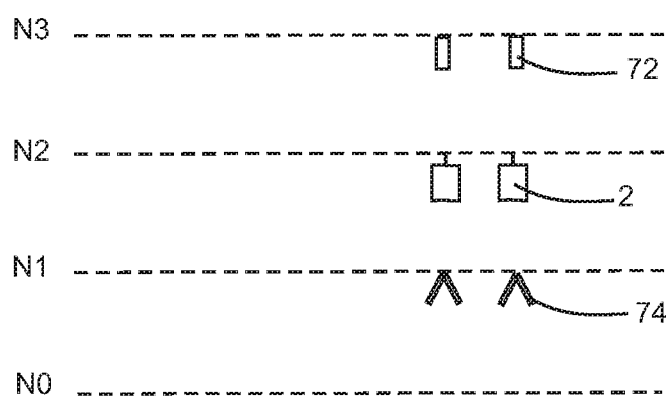

FIG. 4b is an illustration or side view of the magazine apparatus 1 from FIG. 4a. It is clear in this case that three planes are provided on conveying devices, the blow moulds 2 being conveyed in the middle plane N2, holding mandrels for example being conveyed in the upper plane N3 and gripping clamps which can be present at the inlet and outlet points 62 and 64 optionally being conveyed in the lower plane N1. The magazine apparatus is thus used in this case both for receiving the blow mould and for receiving the gripping clamps or tongs as well as the holding mandrels. These components can be jointly interchanged in the context of an exchange procedure.

FIGS. 5a to 5g show a further embodiment of the present inventive concepts. In this case the magazine apparatus 1 is designed in the form of a conveying chain which in this case conveys the blow moulds in a substantially vertical direction between two reversing wheels 51, 53. In addition, an opening 26 is provided, by way of which blow moulds can be supplied to the carrier device 14 and can be removed therefrom. This conveying device 14 is in turn arranged on a stand 16 which is stationary during assembly.

The design in the manner of a paternoster lift is like-wise evident in the illustration in FIG. 5b, in which the blow moulds are supplied and removed by way of the opening 26.

FIG. 5c shows a further embodiment in which the conveying chain 14 is reversed a number of times, so as thereby to increase the receiving capacity without at the same time having to make the magazine apparatus very high. In some embodiments, the conveying chain 14 is reversed a plurality of times, thus increasing capacity of the apparatus.

Figure 5D:
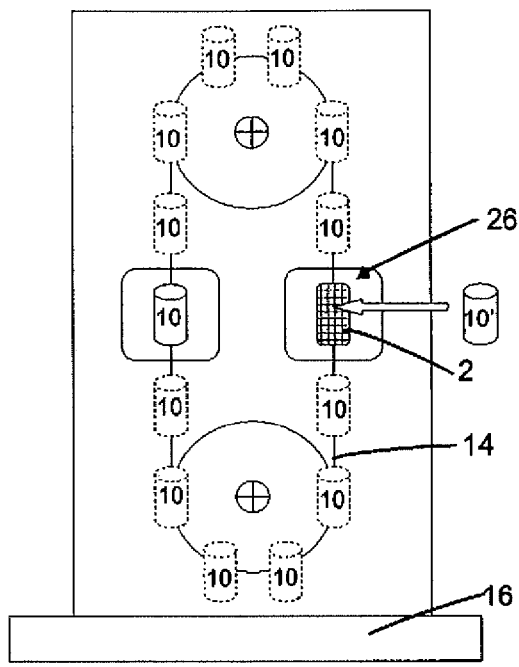
Figure 5E:
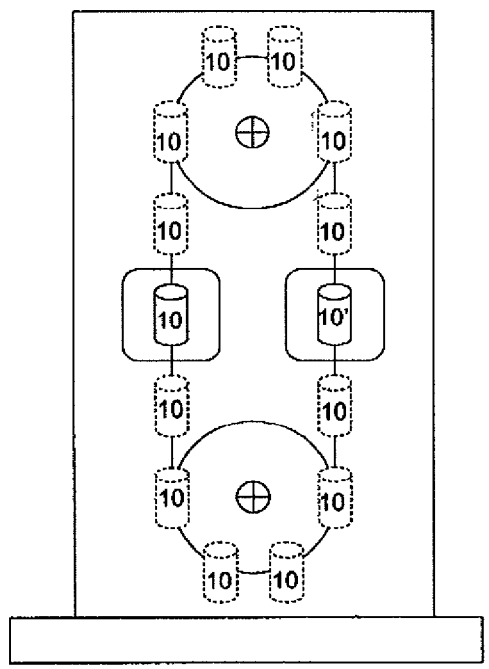
Figure 5F:
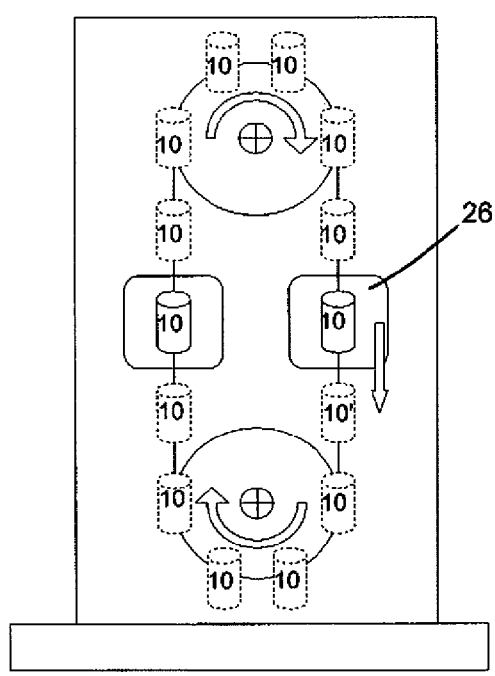
Figure 5G:
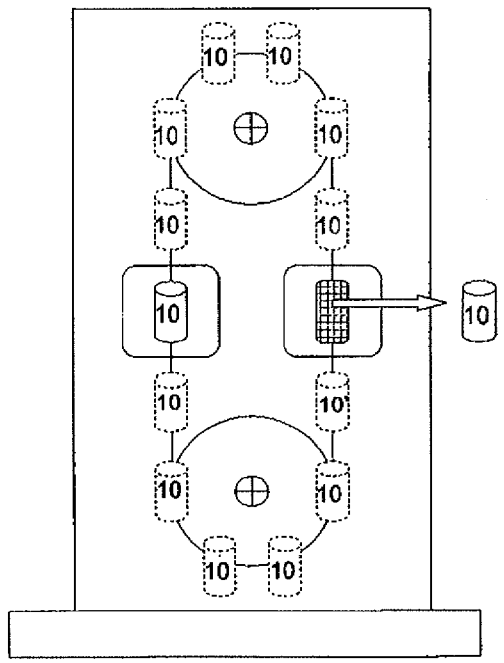

FIGS. 5d to 5g again show the exchange procedure. In the situation shown in FIG. 5d an old blow mould 10' is transferred from the blow-moulding machine by way of the opening 26 to a free receiving element 2. FIG. 5e shows the situation in which the old blow mould 10' is present on the receiving element 2. In FIG. 5f the conveying device has been further clock-timed by one space, so that the old blow mould 10' is now below the opening 26. A new blow mould 10 can now be removed by way of the opening 26 and can be transferred to the blow-moulding machine, as shown in FIG. 5g. The cycle can then be repeated starting from the situation shown in FIG. 5d.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

We claim:

1. A magazine apparatus, comprising a plurality of receiving elements that are constructed and arranged to separately receive individual blow moulds each having a plurality of parts and each configured to shape plastic-material pre-forms into plastic-material containers, wherein the magazine apparatus is constructed and arranged to store a plurality of blow moulds outside the working operational area of a blow moulding machine, wherein the plurality of receiving elements are arranged on a common carrier device, and wherein the magazine apparatus further comprises a stand to which the common carrier device is attached, the common carrier device constructed and arranged so as to be rotatably movable with respect to the stand.

2. The magazine apparatus according to claim 1, wherein the plurality of receiving elements are further configured to receive and store blow moulds in at least a partially assembled state.

3. The magazine apparatus according to claim 1, wherein the working operational area of a blow moulding machine comprises a blow moulding wheel having a plurality of blow moulding carriers.

4. The magazine apparatus according to claim 3, wherein the receiving elements of the magazine apparatus are constructed and arranged to receive blow moulds configured to shape plastic-material pre-forms into plastic-material containers from one or more of the plurality of blow moulding carriers.

5. The magazine apparatus according to claim 3, wherein a number of the receiving elements of the magazine apparatus is greater than a number of blow moulding carriers.

6. The magazine apparatus according to claim 1 further comprising a conveying device for conveying blow moulds received from a blow moulding machine.

7. The magazine apparatus according to claim 1, wherein the magazine apparatus further comprises a driving device for rotatably moving the common carrier device.

8. The magazine apparatus according to claim 7, wherein the driving device is constructed and arranged to be synchronized with a driving device of an appa-ratus configured to shape plastic-material pre-forms into plastic-material containers.

9. The magazine apparatus according to claim 1, wherein the magazine apparatus is movable.

10. The magazine apparatus according to claim 1, wherein a number of the receiving elements is larger than a number of receiving elements of an apparatus configured to shape plastic-material pre-forms into plastic-material containers.

11. The magazine apparatus according to claim 1 further comprising a receiving area for receiving further elements co-operating with blow moulds in the shaping of plastic-material pre-forms into plastic-material containers.

12. The magazine apparatus according to claim 11, wherein the further elements are selected from the group consisting of: holding mandrels, holding clamps, holding members for conveying blow moulds, stretching rods, stretching stops and blow nozzles.

13. The magazine apparatus according to claim 1, wherein the common carrier device comprises a disc-like body, a circulating chain, and a rail or a movable housing.

14. The magazine apparatus according to claim 1 further comprising a transfer area that permits both the take-over of a first blow mould from an apparatus configured to shape plastic-material pre-forms into plastic-material containers and the transfer of a second blow mould to the apparatus configured to shape plastic-material pre-forms into form plastic-material containers.

15. The magazine apparatus according to claim 1 further comprising a plurality of holding devices arranged on a carrier device, wherein at least two receiving elements are provided on each holding device.

16. A method of storing blow moulds which are used for the shaping of plastic-material pre-forms into plastic-material containers, comprising:
   removing blow moulds from an apparatus configured to shape plastic-material pre-forms into plastic-material containers; and
   separately receiving and storing one or more blow moulds in an at least a partially assembled state at one or more of a plurality of receiving elements of a magazine apparatus, wherein the plurality of receiving elements are arranged on a common carrier device, and wherein the magazine apparatus further comprises a stand to which the common carrier device is attached, the common carrier device constructed and arranged so as to be rotatably movable with respect to the stand.

17. The method of claim 16, wherein the plurality of receiving elements of the magazine apparatus are constructed and arranged to separately receive individual blow moulds each having a plurality of parts and that are configured to shape plastic-material pre-forms into plastic-material containers.

18. A magazine apparatus, comprising a plurality of receiving elements that are constructed and arranged to separately receive individual blow moulds each having a plurality of parts and each configured to shape plastic-material pre-forms into plastic-material containers, wherein the magazine apparatus is constructed and arranged to store a plurality of blow moulds outside the working operational area of a blow moulding machine, wherein the plurality of receiving elements are arranged on a common carrier device, and wherein the magazine apparatus further comprises a driving device for rotatably moving the common carrier device.

19. A magazine apparatus, comprising a plurality of receiving elements that are constructed and arranged to separately receive individual blow moulds each having a plurality of parts and each configured to shape plastic-material pre-forms into plastic-material containers, wherein the magazine apparatus is constructed and arranged to store a plurality of blow moulds outside the working operational area of a blow moulding machine, wherein the plurality of receiving elements are arranged on a common carrier device, and wherein the common carrier device comprises a disc-like body, a circulating chain, and a rail or a movable housing.

20. A method of storing blow moulds which are used for the shaping of plastic-material pre-forms into plastic-material containers, comprising:
   removing blow moulds from an apparatus configured to shape plastic-material pre-forms into plastic-material containers; and
   separately receiving and storing one or more blow moulds in an at least a partially assembled state at one or more of a plurality of receiving elements of a magazine apparatus, wherein the plurality of receiving elements are arranged on a common carrier device, and wherein the method the magazine apparatus further comprises a driving device for rotatably moving the common carrier device.

21. A method of storing blow moulds which are used for the shaping of plastic-material pre-forms into plastic-material containers, comprising:
   removing blow moulds from an apparatus configured to shape plastic-material pre-forms into plastic-material containers; and
   separately receiving and storing one or more blow moulds in an at least a partially assembled state at one or more of a plurality of receiving elements of a magazine apparatus, wherein the plurality of receiving elements are arranged on a common carrier device, and wherein the common carrier device comprises a disc-like body, a circulating chain, and a rail or a movable housing.

* * * * *